United States Patent
Huang

[11] Patent Number: 5,872,838
[45] Date of Patent: Feb. 16, 1999

[54] TRIM PHONE CIRCUIT DEVICE HAVING A CALLING LINE IDENTIFICATION

[76] Inventor: Wen-Liang Huang, 2F, No. 20, Lane 204, Sung Shan Rd., Hsin Yi Chu, Taipei, Taiwan

[21] Appl. No.: 865,066

[22] Filed: May 29, 1997

[51] Int. Cl.⁶ .............................. H04M 1/56; H04M 1/00
[52] U.S. Cl. ........................................... 379/142; 379/354
[58] Field of Search ..................................... 379/355, 354, 379/140, 127, 142; 455/566, 574, 415

[56] References Cited

U.S. PATENT DOCUMENTS

| | | | |
|---|---|---|---|
| 4,924,496 | 5/1990 | Figa et al. ................................ | 379/142 |
| 5,263,084 | 11/1993 | Chaput et al. .......................... | 379/215 |
| 5,526,406 | 6/1996 | Luneau .................................... | 379/61 |
| 5,553,125 | 9/1996 | Martensson ............................. | 379/140 |
| 5,581,599 | 12/1996 | Tsuji et al. .............................. | 379/63 |
| 5,659,602 | 8/1997 | Gay ......................................... | 379/142 |

*Primary Examiner*—Daniel S. Hunter
*Assistant Examiner*—Charles N. Appiah
*Attorney, Agent, or Firm*—Browdy and Neimark

[57] ABSTRACT

A trim phone circuit device is composed of a base portion and a hand set portion which is connected with the base portion by a four-core line. The trim phone circuit device is capable of a calling line identification in view of a bridge rectifier circuit unit which has a positive terminal output capable of providing the telephone circuit with the power source and of reading the calling line information furnished by the phone company. When the bridge rectifier circuit unit of the base portion is turned on all the time to keep a calling line signal in the on-hook state on the phone line, the calling line detection circuit unit of the hand set portion is provided with the calling line signal in a single end input configuration so as to enable the trim phone circuit device to identify the calling line.

5 Claims, 3 Drawing Sheets

not available …

TRIM PHONE CIRCUIT DEVICE HAVING A CALLING LINE IDENTIFICATION

FIELD OF THE INVENTION

The present invention relates generally to a telephone circuit device, and more particularly to a trim phone circuit device capable of calling line identification.

BACKGROUND OF THE INVENTION

The cord of a conventional Trim phone to connect with its handset and base needs three cores, i.e., the on-hook terminal, the positive output terminal of bridge rectifier and the ground terminal. The operation of the conventional calling line identification circuit is based on the differential input configuration. It is well known that the differential input configuration has two input terminals, so that the cord of a conventional Trim phone must have more than four cores to connect with the conventional calling line identification circuit for having a caller identification function. But, in view of the fact that the cord of a trim phone to connect with its handset and base only has four cores, the trim phone is incapable of connecting with the conventional calling line identification circuit for identifying a calling line.

FIG. 2 illustrates the conventional three-wire cord telephone of the type with a handset H, base B, and cord C (also shown in FIG. 2). In FIG. 3 the dashed line schematically indicates the cord C and the wires are labeled 1, 2, and 3 (ground). Wires 1 and 2 branch from one terminal of a bridge rectifier circuit 10 and wire 1 includes a hook switch 30. The conventional phone of FIG. 3 includes no caller identification unit.

FIG. 4 illustrates the conventional circuitry for caller identification. The identification unit 70 is coupled directly to the tip and ring lines from the telephone company through an optional surge protector.

Because of this conventional circuitry, if a caller identification device is to placed into the handset H then the cord C must be a five-wire cord. However, standard telephone cords and jacks only contain four wires.

SUMMARY OF THE INVENTION

The primary objective of the present invention is to provide a trim phone with a circuit device capable of identifying a calling line.

In keeping with the principle of the present invention, the foregoing objective of the present invention is attained by a trim phone circuit device, which consists of a base portion and a handset portion which is connected with the base portion by a four-core cord. The base portion has a bridge rectifier circuit unit, a ringer generator circuit unit, a hook switch and a power supply unit. The handset portion has a dialing circuit unit, a ring detection unit, a current loop circuit unit, and a calling line detection circuit unit. The trim phone circuit device is capable of a calling line identification in view of the bridge rectifier circuit unit which has a positive terminal output capable of providing the telephone circuit with the power source, and of reading the calling line information furnished by the telephone company. When the bridge rectifier circuit unit of the base portion is turned on all the time to keep a calling line signal in the on-hook state on the phone line, the calling line detection circuit unit of the hand set portion is provided with the calling line signal in a single end input configuration, so as to enable the trim phone to identify the calling line.

The foregoing objective, features and functions of the present invention will be more readily understood upon a thoughtful deliberation of the following detailed description of an embodiment of the present invention with reference to the accompanying drawing.

DETAILED DESCRIPTION OF THE INVENTION

Figure 1:
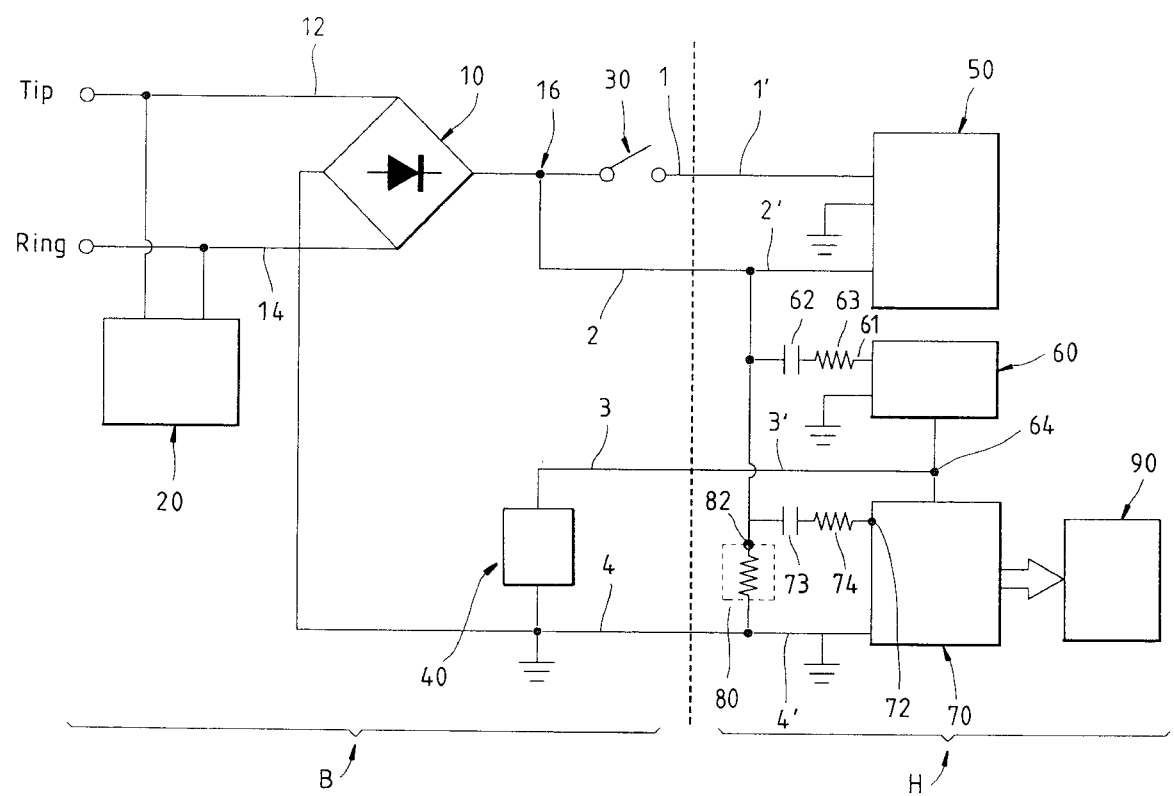
FIG. 1 shows a circuitry of the embodiment of the present invention.
Figure 2:
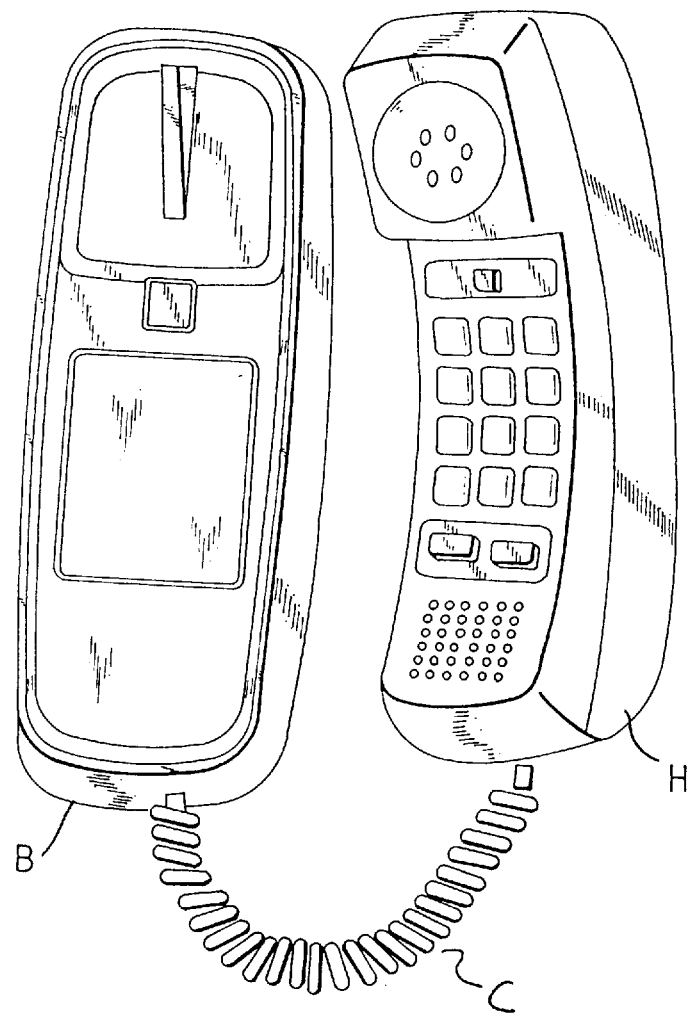
FIG. 2, labeled "prior art", is a perspective view of a telephone of the type with a base and handset.
Figure 3:
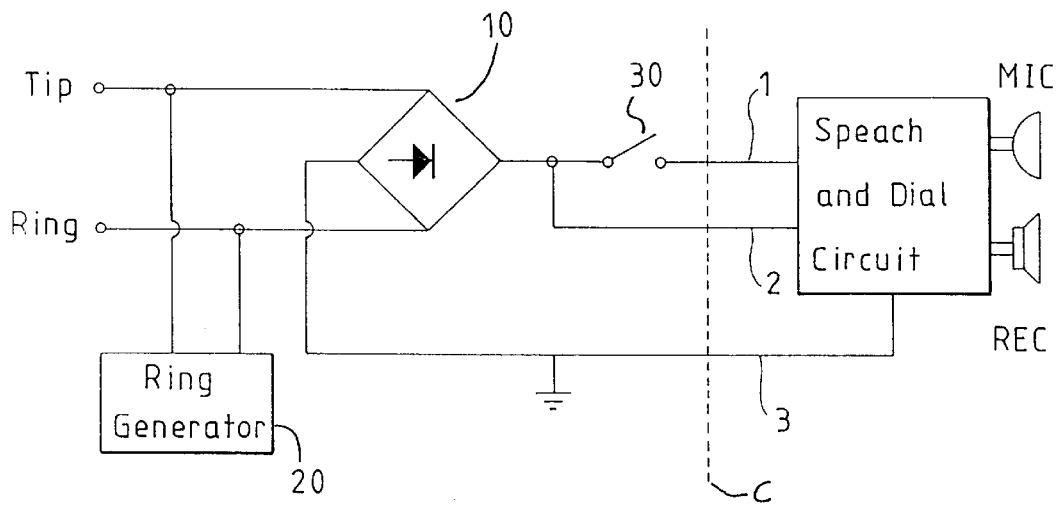
FIG. 3, labeled "prior art", is a schematic view of a portion of a telephone circuit.
Figure 4:
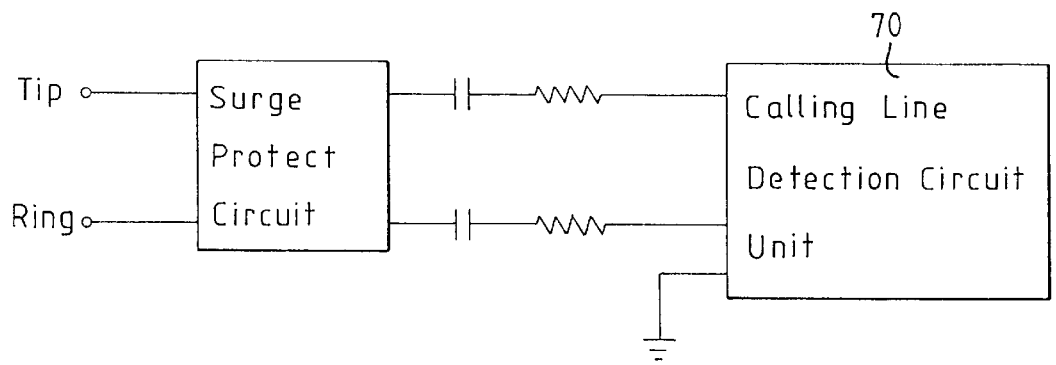
FIG. 4, labeled "prior art", is a schematic view of a portion of a telephone circuit.

As illustrated in FIG. 1, a trim phone circuit device embodied in the present invention is composed of a base portion B and a handset portion H which is connected with the base portion B by a four-core cord.

The base portion B has a bridge rectifier circuit unit 10, a ringer generator 20, a hook switch 30, and a power supply unit 40. The bridge rectifier circuit unit 10 is connected at two input terminals 12 and 14 thereof with two signal input lines (tip and ring) of the telephone line. The ringer generator 20 is connected in a parallel manner with the two input terminals 12 and 14 of the bridge rectifier circuit unit 10. A first output line 1 and a second output line 2 are derived directly from the positive output terminal 16 of the bridge rectifier circuit unit 10. The positive output terminal 16 is connected in series with the hook switch 30 to the output line 1. A third output line 3 is derived from the positive terminal of the power supply 40. A fourth output line 4 is derived from the common ground terminal of the bridge rectifier circuit unit 10 and the power supply 40.

The handset portion H has a speech network with dialer (a dialing circuit unit)50, a ringer detector 60, a calling line detection circuit unit (it can be an FSK or DTMF receiver circuit) 70, a current loop circuit unit (a resistor) 80, and a liquid crystal display 90.

The handset portion H further has a first input line 1' derived from one end of the speech network with dialer 50 and connected with the first output line 1, a second input line 2' derived from the other end of the speech network with dialer 50 and connected with the second output line 2. An input terminal 61 of the ring detector 60 is first connected in series with a capacitor 62 and a resistor 63, and is then connected with the second input line 2'. A third input line 3' is derived from the common power source input terminal 64 of the ring detector 60 and the calling line detection circuit unit 70, and is connected with the third output line 3. A fourth input line 4' is derived from the common ground terminal of the current loop circuit unit 80 and the calling line detection circuit unit 70, and is connected with the fourth output line 4. The input terminal 72 of the calling line detection circuit unit 70 is first connected in series with a capacitor 73 and a resistor 74 and is then connected with the second input line 2' along with the input terminal 82 of the resistor 80. The liquid crystal display 90 is connected with the output terminal of the calling line detection circuit unit 70.

The alternating current signal is received by the bridge rectifier circuit unit 10 via two signal input lines (tip and ring). The signal is transmitted through the positive output terminal 16 to the ground terminal via the resistor 80. The ring is detected by the input terminal 82 of the resistor 80. The incoming call message display information delivered from the telephone company is also read. The power supply 40 is the power source of the calling line detection circuit unit 70. When the ring signal is delivered by the telephone company, there is a change in voltage at the input terminal 82 of the resistor 80. In the meantime, the ring detector 60 executes its detection job to determine the accuracy of the ring before instructing the calling line detection circuit unit 70 to read the information of the input terminal 82. The information so read is then displayed on the liquid crystal display 90.

What is claimed is:

1. A trim phone circuit device comprising a base portion and a hand set portion;

wherein said base portion has a bridge rectifier circuit unit, a ringer generator, a hook switch, and a power supply unit, said bridge rectifier circuit unit being connected at two input terminals thereof with two signal input lines (tip and ring) of a telephone line system such that said two input terminals of said bridge rectifier circuit unit are connected with said ringer generator in a parallel manner;

wherein said base portion further has a first output line derived from one end of said hook switch after said hook switch is connected in series with a positive output terminal of said bridge rectifier circuit unit, a second output line derived directly from said positive output terminal of said bridge rectifier circuit unit, a third output line derived from a positive terminal of said power supply unit, and a fourth output line derived from a common ground terminal of said bridge rectifier circuit unit and said power supply unit;

wherein said handset portion has a dialing circuit unit, a ring detection unit, a current loop circuit unit, and a calling line detection circuit unit;

wherein said handset portion further has a first input line derived from one terminal of said dialing circuit unit and connected with said first output line, a second input line derived from the other terminal of said dialing circuit unit and connected with said second output line, a third input line derived from a common power supply input terminal of said ring detection unit and said dialing circuit unit and connected with said third output line, and a fourth input line derived from a common ground terminal of said current loop unit and said calling line detection circuit unit and connected with said fourth output line; and said current loop circuit unit has a signal input terminal which is first connected with an input terminal of said calling line detection circuit unit in a parallel manner and is then connected with said second input line.

2. The trim phone circuit device as defined in claim 1, wherein said handset portion further comprises a liquid crystal display which is connected with an output terminal of said calling line detection circuit unit.

3. The trim phone circuit device as defined in claim 1, wherein said current loop circuit unit comprises a resistor.

4. The trim phone circuit device as defined in claim 1, wherein said calling line detection circuit unit is an FSK receiver circuit.

5. The trim phone circuit device as defined in claim 1, wherein said calling line detection circuit unit is a DTMF receiver circuit.

\* \* \* \* \*